United States Patent [19]

Hawkins et al.

[11] Patent Number: 4,973,977

[45] Date of Patent: Nov. 27, 1990

[54] DIGITAL TO AMPLITUDE MODULATED ANALOG CONVERTER

[75] Inventors: Joseph D. Hawkins; Thomas B. Reynolds, both of Los Altos, Calif.

[73] Assignee: Comlux, Mountain View, Calif.

[21] Appl. No.: 277,136

[22] Filed: Nov. 29, 1988

[51] Int. Cl.[5] .............................................. H03M 1/66
[52] U.S. Cl. ..................................... 341/144; 341/147
[58] Field of Search .................. 341/144, 147; 375/41, 375/28, 29, 39, 24

[56] References Cited

U.S. PATENT DOCUMENTS

| | | | |
|---|---|---|---|
| 3,497,625 | 2/1970 | Hileman et al. | 375/41 X |
| 3,939,303 | 2/1976 | Wise | 375/24 X |
| 4,003,003 | 1/1977 | Haeberlin | 375/46 X |
| 4,346,354 | 8/1982 | Hanna | 375/41 X |
| 4,656,440 | 7/1987 | Gautschi | 332/45 |
| 4,675,619 | 6/1987 | Uchibori et al. | 375/41 X |
| 4,703,308 | 10/1987 | Belcher | 341/144 |
| 4,780,884 | 10/1988 | Karabinis | 375/39 |
| 4,837,573 | 6/1989 | Brooks | 341/144 X |

OTHER PUBLICATIONS

Mischa Schwartz, *Information, Transmission, Modulation, and Noise*, McGraw-Hill Book Company, Third Edition, 1980, pp. 244-246.

*Primary Examiner*—William M. Shoop, Jr.
*Assistant Examiner*—Sharon D. Logan
*Attorney, Agent, or Firm*—Fliesler, Dubb, Meyer & Lovejoy

[57] ABSTRACT

A low cost, high quality converter for generating an amplitude modulated signal in response to a sequence of digital words representing a modulation signal, such as a video image. The converter receives the sequence of digital words at an input rate. The input sequence of digital words is combined with a sequence of factors at a sample rate to generate a second sequence of digital words at the sample rate representing the amplitude modulated signal. The second sequence of digital words is then converted to the amplitude modulated signal. The sequence of factors is a sequence of cosines of the carrier frequency at the carrier phase angle of 45, 135, 225 and 315 degrees. The value of these cosines are +0.707, −0.707, −0.707, +0.707 respectively. These values are normalized to 1 so that they become a sequence of +1, −1, −1, and +1. Multiplication by the sequence of factors is thus carried out by alternately inverting the input sequence of digital words at one-half the sample rate.

20 Claims, 2 Drawing Sheets

DIGITAL TO AMPLITUDE MODULATED ANALOG CONVERTER

FIELD OF THE INVENTION

The present invention relates to apparatus for converting a digital signal to an amplitude modulated analog signal; and particularly to conversion of digital video data to a RF amplitude modulated video signal.

DESCRIPTION OF RELATED ART

Television receivers are adapted for receiving a high frequency amplitude modulated television signal according to industry standard transmission formats. The NTSC television standard, for example, specifies a vestigial sideband AM television signal. Transmission of the standard AM television signals across high quality communications links has proved difficult and costly.

Television signals can be digitized to form a sequence of words of digital data, each specifying information relating to a pixel in the television image. However, according to the prior art, it has been difficult and expensive to convert these digital television images to the amplitude modulated format suitable for reception by standard television receivers. Such systems involve first conversion of the digital video signal to an analog video, then combining the analog video with the high frequency carrier to generate the standard AM signal. Such converters are complicated electronic systems that are expensive to manufacture, and therefore unsuitable for use in large numbers of home television receivers.

It is desirable to provide a digital to amplitude modulated converter that is inexpensive and supports digital transmission of television signals to the home. In addition, digital to AM modulated conversions have a widespread application in other video applications, such as video recording, computer processing of video data, and for conversion of digital information to any other amplitude modulated analog signal.

SUMMARY OF THE INVENTION

The present invention provides a low cost, high quality apparatus for generating an amplitude modulated signal in response to a sequence of digital words representing a modulation signal, such as a video image. The apparatus includes a communication link that supplies the sequence of digital words at an input rate. The input sequence of digital words is combined with a sequence of factors at a sample rate to generate a second sequence of digital words at the sample rate representing the amplitude modulated signal. The second sequence of digital words is then converted to the amplitude modulated signal.

According to one embodiment, the sequence of factors is a sequence of cosines of the carrier frequency at the carrier phase angles of 45, 135, 225 and 315 degrees. The values of these cosines are +0.707, −0.707, −0.707, +0.707, respectively. These values are normalized to 1 so that they become a sequence of +1, −1, −1, and +1.

According to this embodiment, the apparatus includes a digital multiplier that provides for multiplication of the input digital word by the sequence of +1 or −1 factors at the sample rate. This creates a sampled version of an amplitude modulated waveform in the digital domain. With the use of high speed digital analog converter and a bandpass filter, the amplitude modulated waveform is reconstructed with high accuracy and at high speed.

DETAILED DESCRIPTION

With reference to the Figures, a detailed description of a preferred embodiment of the present invention is provided.

Figure 1:
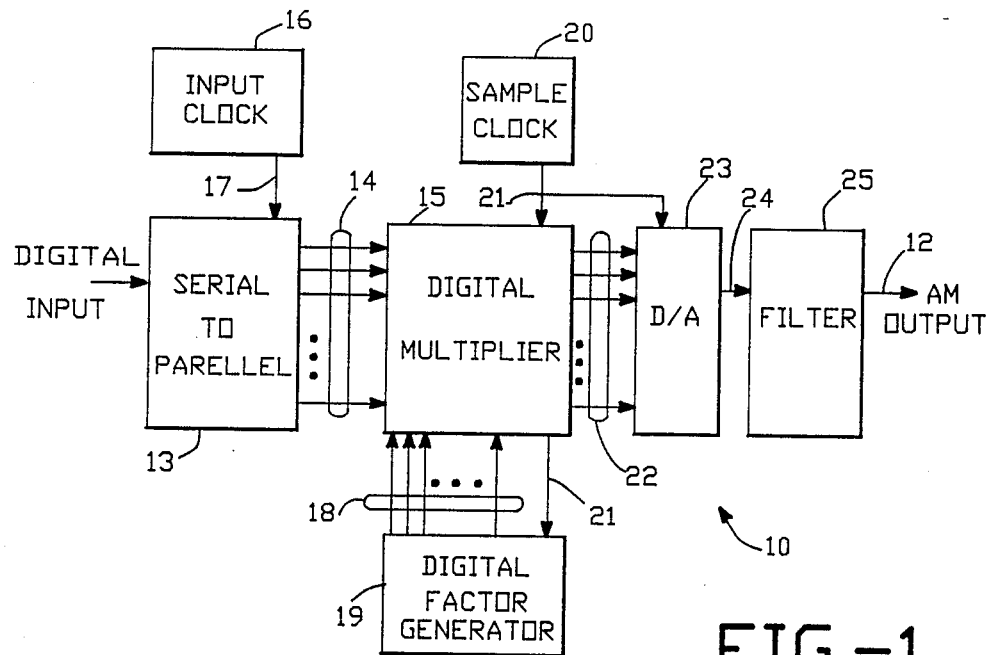
FIG. 1 is a block diagram of the digital to AM modulated output converter according to the present invention.
Figure 2:
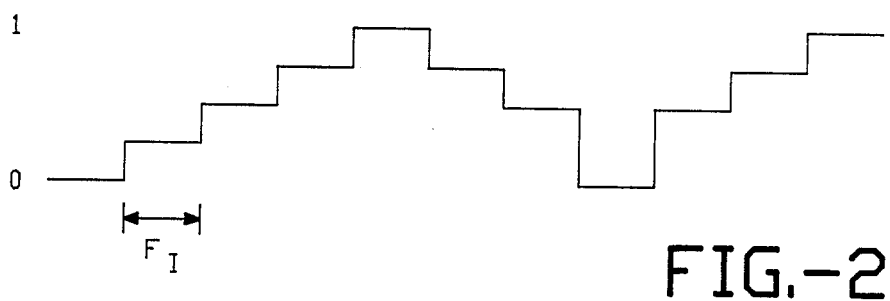
FIG. 2 is a simplified graphic illustration of a digital input signal.
Figure 3:
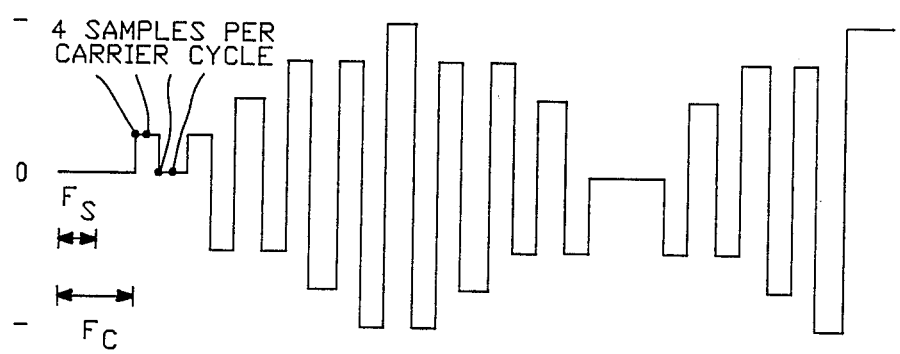
FIG. 3 is a simplified graph of the output of the digital-to-analog converter of FIG. 1 in response to the digital/input signal of FIG. 2.
Figure 4:
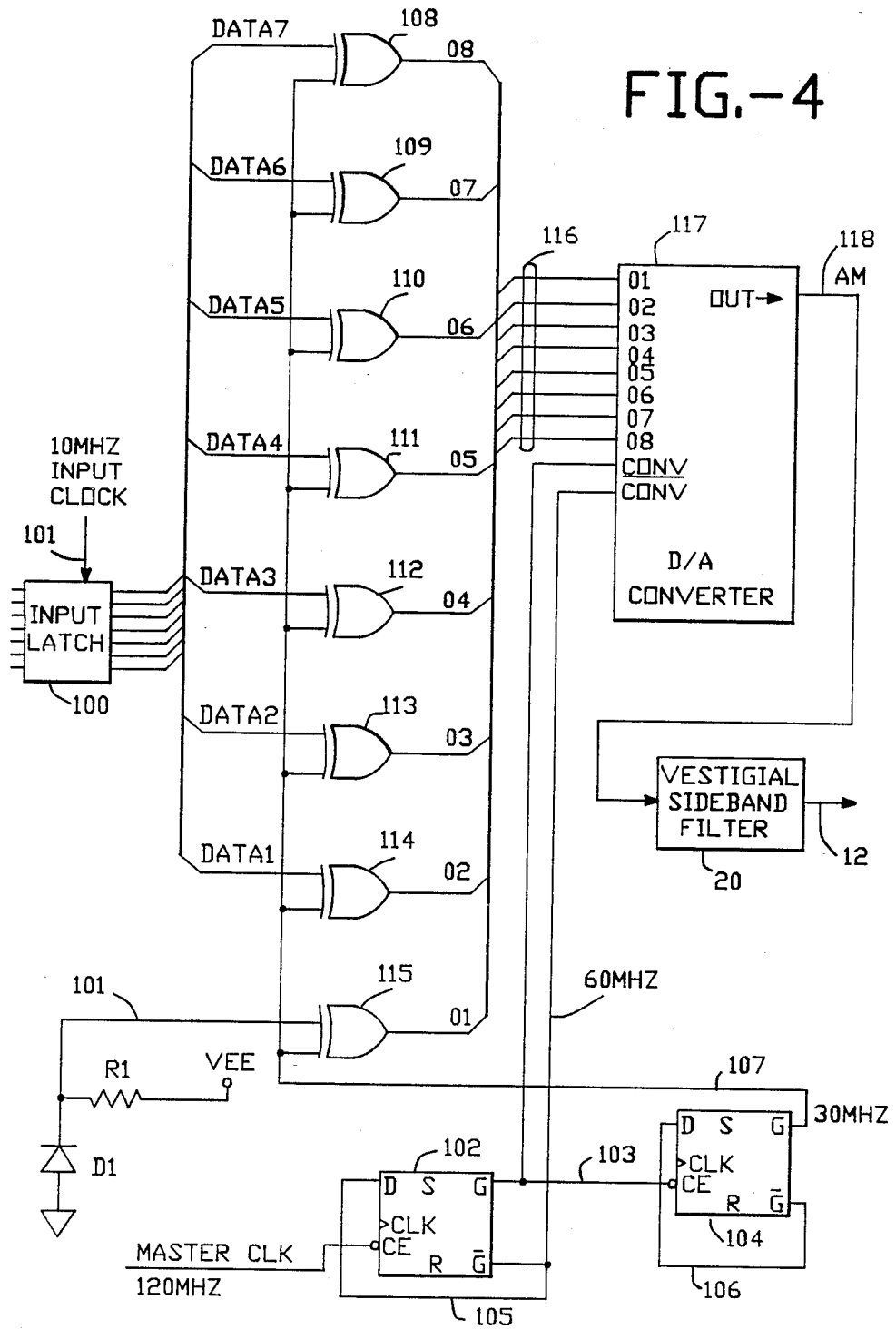
FIG. 4 is a circuit diagram of a preferred embodiment of the present invention.

FIG. 1 provides a block diagram of the present invention. FIGS. 2 and 3 are used to describe the operation of the apparatus of FIG. 1. FIG. 4 illustrates a specific embodiment of the present invention.

As illustrated in FIG. 1, the digital to AM modulated output converter 10 receives a digital input on communication line 11 and converts that input to a vestigial sideband AM output signal on line 12. The digital input may be in the form of a pulse code modulated serial data stream which is supplied to a serial-to-parallel converter 13. The serial-to-parallel converter supplies a sequence of n-bit digital words across lines 14 to a clocked digital multiplier 15. The sequence of digital words on lines 14 is supplied at an input clock rate in response to input clock 16, which is connected to the serial-to-parallel converter across line 17.

The clocked digital multiplier 15 receives a sequence of digital factors on lines 18 from digital factor generator 19. Also the clocked digital multiplier 15 is coupled to a sample clock 20 across line 21. The sample clock is likewise coupled to the digital factor generator 19 across line 21. The digital multiplier 15 multiplies, at the sample clock rate, the sequence of digital factors supplied across lines 18 by the sequence of input data supplied across lines 14 and generates a sequence of m-bit digital words on lines 22 at the sample clock rate. The sequence of m-bit digital words is supplied on lines 22 to a digital-to-analog converter 23. The digital-to-analog converter 23 converts the sequence of digital words supplied on lines 22 to a square wave at a carrier frequency whose amplitude varies in response to the digital words supplied on lines 22. This square wave is supplied at the output of digital-to-analog converter across line 24 to a filter 25. The output of the filter is the AM modulated output.

The process of amplitude modulation can be described mathematically as follows:

$$E(t) = (1 + f(t)) * \cos(W_c * t) \quad (1)$$

where $E(t)$ = Resultant amplitude modulated waveform
  $f(t)$ Modulating waveform varying between +1 and −1
  $W_c$ = Carrier frequency According to the Nyquist sampling theory, if we take samples of a given waveform at a rate greater than twice the highest frequency in the waveform, we can exactly reconstruct the original waveform. Thus, if we sample $E(t)$ with a frequency greater than twice the sum of both the carrier frequency and the maximum modulation frequency, we can reconstruct the amplitude modulated waveform E(t) from the samples.

If we assume that the maximum modulation frequency is less than the carrier frequency and we sample the resultant at a frequency four times the carrier frequency, then the Nyquist sampling criterion is satisfied.

We can choose any point at which to sample the waveform E(t). We choose, in the preferred system, to sample at carrier phase angles of 45, 135, 225, and 315 degrees. In this case the value of cos(Wc*t) has the values of +0.707, −0.707, −0.707, and =0.707 respectively. If we normalize these values to 1, they become +1, −1, −1, and +1. Thus the multiplication by cos(Wc*t) becomes a simple multiplication by +1 or −1.

The following describes a particular implementation of the multiplication process operating on an unsigned 7 bit parallel digital word. In the following discussion the numerical values will be expressed both in decimal and binary form.

We start with an unsigned 7 bit digital word which has the following range of values:

| 0000000 | to | 1111111 |
|---|---|---|
| 0 | to | 127 |

Next, we add an eighth bit in the most significant bit position to create an unsigned 8 bit word. This bit can be either a 1 or 0; and the value of this bit will determine the sense of the resulting amplitude modulation (positive or negative).

| 0 0000000 | to | 0 1111111 |
|---|---|---|
| 0 | to | 127 |
| | OR | |
| 1 0000000 | to | 1 1111111 |
| 128 | to | 255 |

If we invert this unsigned 8 bit word we get the following results:

| Bit 8 set to 0: | | |
|---|---|---|
| 0 0000000 | invert → | 1 1111111 |
| 0 | invert → | 256 |
| 0 1111111 | invert → | 1 0000000 |
| 127 | invert → | 128 |

The above is what is normally considered negative modulation. An input value of 0000000 results in maximum excursion of output.

| Bit 8 set to 1: | | |
|---|---|---|
| 1 0000000 | invert → | 0 1111111 |
| 128 | invert → | 127 |
| 1 1111111 | invert → | 0 0000000 |
| 255 | invert → | 0 |

The above is what is normally considered positive modulation. An input value of 0000000 results in minimum excursion of output.

If the original unsigned 7 bit word is W7 then the numerical value of the noninverted and inverted unsigned 8 bit word is:

| Resultant = W7 | (Noninverted) |
|---|---|
| Resultant = 255 − W7 | (Inverted) |

If we now level shift the resultant word by 127.5 we get:

| Resultant = W7 − 127.5 | (Noninverted) |
|---|---|
| Resultant = −W7 + 127.5 | (Inverted) |

This result can also be expressed as:

| Resultant = +1*(W7 − 127.5) | (Noninverted) |
|---|---|
| Resultant = −1*(W7 − 127.5) | (Inverted) |

Thus we can see that the process of inverting the unsigned 8 bit word is equivalent to first adding an offset of −127.5 to the unsigned 7 bit word and then multiplying the resultant by a factor of −1. The noninverted unsigned 8 bit word is equivalent to multiplying the same resultant by +1.

We therefore conclude that with an 8 bit inverter circuit we can realize an equivalent digital multiplier that allows multiplication of a 7 bit digital word by factors of +1 or −1. This allows the creation of a sampled version of an amplitude modulated waveform in the digital domain. With the use of a high speed digital to analog converter and bandpass filter we can reconstruct the amplitude modulated waveform with a to peak accuracy of 8 bits.

FIG. 2 illustrates the analog equivalent of a digital input stream such as may be supplied across lines 14 in the circuit of FIG. 1. The input clock rate is at a frequency F1.

FIG. 3 illustrates the output of the D/A converter 23 in response to the digital input shown in FIG. 2, where the sample clock $F_s$ is three times F1, and the digital factors are the normalized values of the cosines of 45, 135, 225, and 315 degrees as discussed above. Using these factors, the input data stream at the rate F1 is alternatively inverted at twice the carrier rate $F_c$. This is equivalent to multiplication by the +1, +1, −1, −1 sequence of factors at four times the carrier rate, creating four samples per cycle of the carrier, and therefore satisfies the Nyquist criterion. The resulting sequence of digital words is supplied to the digital-to-analog converter 23. The digital-to-analog converter 23 converts the digital input to analog output at twice the carrier rate to produce the output signal in the form shown in FIG. 3.

FIG. 4 shows a circuit implementation of the converter of the present invention utilizing the normalized values of the cosines of 45, 135, 225, and 315 degrees as the sequence of digital factors by which the input sequence is multiplied.

The parallel input words are received at input latch 100 at the input rate in response to input clock 101. The input clock rate may be, for instance, 10 megahertz. In this embodiment, the input sequence comprises 7 bit words to which an eighth bit is appended across line 101. This eighth bit is a fixed "1" value supplied through resistor R1 and diode D1 from a reference voltage VEE. The anode of diode D1 is coupled to ground.

A master clock at 120 megaHertz is supplied to clock the D flipflop 102. The Q output of D flipflop 102 is supplied on line 103 to clock the D flipflop 104. The $\overline{Q}$ output of D flipflop 102 is fed back across line 105 as the D input to the D flipflop 102. Likewise, the $\overline{Q}$ output of flipflop 104 is supplied across line 106 to the D input of flipflop 104, in both cases to form a divide by 2 circuit.

The Q output of flipflop 104 is a clock at ¼ master clock frequency which is supplied on line 107. This clock signal on line 107 is connected to the inputs of a clocked inverter circuit made up of an array of exclusive-OR gates 108–115. The second input to exclusive-OR gate 115 is the +1 signal on line 101. The second input to exclusive-OR gate 114 is the first bit DATA1 of the input sequence of digital words. The second input to exclusive-OR gate 113 is the second bit DATA2 of the input sequence of digital words. The second input to exclusive-OR gate 112 is the third bit of the input sequence of digital words. The second input to exclusive-OR gate 111 is the fourth bit DATA4 of the input sequence of digital words. The second input to exclusive-OR gate 110 is the fifth bit DATA5 of the input sequence of digital words. The second input to exclusive-OR gate 109 is the sixth bit DATA6 of the input sequence of digital words. The second input to exclusive-OR gate 108 is the seventh bit DATA7 of the input sequence of digital words. By combining the input sequence of digital words and the appended bit from line 101 with the clock signal on line 107 in the array of exclusive-OR gates, an output sequence of digital words which changes value every 16.7 nanoseconds is generated on lines 116 (16.7 ns=½ period of 30 MHz SQ WAVE). In effect, the input sequence of digital words is alternatively inverted at 60 megaHertz.

The sequence of digital words on lines 116 are supplied as inputs to digital-to-analog (D/A) converter 117. The D/A converter 117 converts in response to the 60 megaHertz clock on lines 103 and 105, the digital input every 16.7 nanoseconds to produce an AM output in the form of a square wave similar to that described with reference to FIG. 3. This AM output is supplied to filter 120 as discussed with reference to FIG. 1 to generate a smooth AM signal with a carrier rate of 30 megaHertz. Filter 120 is a SAW-type vestigal sideband filter. The output of filter 120 is the AM modulated carrier.

The circuit of FIG. 4 illustrates a converter which generates an output with a 30 megaHertz carrier frequency. The carrier frequency is limited by the frequency response of the D/A converter 117. In the embodiment shown, D/A converter is a TDC1018 commercially available through TRW LSI PRODUCTS, INC., La Jolla, Calif. This D/A converter could be driven at frequencies in the lower NTSC television channel range if desired. Faster components, such as those manufactured with gallium arsenide (e.g. Tri-Quint TQ6112B, 1 Giga Sample/sec., TriQuint Semiconductor, Beaverton, Ore.), could be used so that the entire standard television channel range could be generated using the circuit shown in FIG. 4.

Alternatively, a frequency mixer as known in the art could be used to convert the 30 MHz AM modulated carrier to standard television channel frequencies.

The quality of the output amplitude modulated signal can be improved by using an input digital sequence of a larger number of bits to provide greater digital resolution for each pixel in the television image.

It can be seen that the digital to amplitude modulated converter can be manufactured using a few relatively inexpensive components. Using this device, becomes practical for digital transmission of video signals to a large number of receiving stations. Furthermore, the digital input could be supplied across a communication link like fiberoptic cable systems, or from digital storage media like optical compact disks, magnetic media, or other commonly used digital storage media.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. An apparatus for generating an amplitude modulated signal, in response to a first sequence of digital words representing a modulation signal; comprising:
    means for supplying the first sequence of digital words at an input rate;
    means, connected to the means for supplying, for combining the digital words in the first sequence with a sequence of factors including cos $\pi/4$, cos $\pi/4$ cos $5\pi/4$, and cos $7\pi/4$ at a sample rate, to generate a second sequence of digital words at the sample rate representing the amplitude modulated signal; and
    means, connected to the means for combining, for converting the second signal of digital words to the amplitude modulated signal.

2. The apparatus of claim 1, wherein the sample rate is greater than the NyQuist rate for the amplitude modulated signal.

3. The apparatus of claim 1, wherein the sequence of factors is normalized to +1, −1, −1 and +1, and the means for combining includes
    means for multiplying the digital words in the first sequence alternatively by +1 and by −1 at one half the sample rate.

4. The apparatus of claim 1, further including means, receiving an input sequence of n bit digital words representing the modulation signal, for supplying a sequence of n+1 bit digital words, wherein the most significant bit position of each +1 bit word is a constant and the n less significant bit positions in the n+1 bit word are an n bit digital word from the input sequence.

5. The apparatus of claim 4, wherein the constant determines the sense of the amplitude modulated signal.

6. The apparatus of claim 1, wherein the amplitude modulated signal has a carrier frequency, and the carrier frequency corresponds to a television channel.

7. The apparatus of claim 6, wherein the first sequence of digital words comprise a digital video signal.

8. An apparatus for generating an amplitude modulated signal, in response to a first sequence of digital words representing a modulation signal; comprising:
    means for supplying the first sequence of digital words at an input rate;
    means, connected to the means for supplying, for alternately inverting the digital words in the first sequence at a sample rate, to generate a second sequence of digital words at the sample rate; and means, connected to the means for alternately inverting, for converting the second sequence of digital words to an analog output at the sample rate, wherein the analog output represents the amplitude modulated signal.

9. The apparatus of claim 8, wherein the amplitude modulated signal has a carrier frequency and the sample rate is two times the carrier frequency.

10. The apparatus of claim 8, further including
means, connected to the means for converting, for filtering the analog output.

11. The apparatus of claim 8, further including means, receiving an input sequence of n bit digital words representing the modulation signal, for supplying a sequence of n+1 bit digital words as the first sequence of digital words, wherein the most significant bit position of each n+1 bit word is a constant and the n less significant bit positions in each n+1 bit word are an n bit digital word from the input sequence.

12. The apparatus of claim 11, wherein the constant determines the sense of the amplitude modulated signal.

13. The apparatus of claim 8, wherein the amplitude modulated signal has a carrier frequency, and the carrier frequency corresponds to a television channel.

14. The apparatus of claim 8, wherein the first sequence of digital words comprises a digital video signal.

15. An apparatus for generating an amplitude modulated signal, in response to a first sequence of n-bit digital words representing a modulation signal; comprising:
means, receiving the first sequence of n-bit digital words at an input rate, for supplying a second sequence of n+1 bit digital words, wherein the most significant bit position of each of said n+1 bit digital words is a constant and the n less significant bit positions in said n+1 bit digital words are an n bit digital word from the first sequence;

n+1 exclusive-OR gates, each having a first input coupled to receive a respective bit from said n+1 bit digital words in said second sequence, a second input coupled to receive a switching clock signal having a switching frequency, and an output, for supplying n+1 output bits in parallel at the switching frequency; and means, connected to receive said n+1 output bits in parallel, for converting the n+1 output bits to an analog output at a sample frequency, wherein the analog output represents the amplitude modulated signal.

16. The apparatus of claim 5, further including;
means, connected to the means for converting, for filtering the analog output.

17. The apparatus of claim 15, wherein the constant determines the sense of the amplitude modulated signal.

18. The apparatus of claim 15, wherein the amplitude modulated signal has a carrier frequency, and the carrier frequency corresponds to a television channel.

19. The apparatus of claim 15, wherein the first sequence of digital words comprises a digital video signal.

20. The apparatus of claim 15, wherein the switching clock signal consists essentially of a square wave at the switching frequency, and the sample frequency is twice the switching frequency.

* * * * *